(12) United States Patent
Balmakhtar et al.

(10) Patent No.: US 12,341,817 B2
(45) Date of Patent: Jun. 24, 2025

(54) TESTING NETWORK COMMUNICATION WITHIN A ZERO TRUST SECURITY MODEL

(71) Applicant: T-Mobile Innovations LLC, Overland Park, KS (US)

(72) Inventors: Marouane Balmakhtar, Fairfax, VA (US); Serge Manning, Plano, TX (US); Greg Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 419 days.

(21) Appl. No.: 17/836,987

(22) Filed: Jun. 9, 2022

(65) Prior Publication Data

US 2023/0403304 A1     Dec. 14, 2023

(51) Int. Cl.
    *H04L 9/40*     (2022.01)

(52) U.S. Cl.
    CPC .............. *H04L 63/20* (2013.01); *H04L 63/10* (2013.01)

(58) Field of Classification Search
    CPC ........ H04L 63/20; H04L 63/10; H04L 63/105
    See application file for complete search history.

(56) References Cited

U.S. PATENT DOCUMENTS

| | | | | |
|---|---|---|---|---|
| 10,901,032 B1 * | 1/2021 | Afanador | ................. | G06N 5/02 |
| 2011/0191579 A1 * | 8/2011 | Xiao | ................... | H04L 63/0869 |
| | | | | 713/155 |
| 2012/0255022 A1 * | 10/2012 | Ocepek | ................. | G06F 21/552 |
| | | | | 726/25 |
| 2015/0127983 A1 * | 5/2015 | Trobough | ........... | G06F 11/2733 |
| | | | | 714/30 |
| 2017/0053711 A1 * | 2/2017 | Shibata | ............ | G11C 29/56012 |
| 2019/0259097 A1 * | 8/2019 | Raleigh | ................. | H04M 15/68 |

OTHER PUBLICATIONS

Rose et al. Zero Trust Architecture, https://nvlpubs.nist.gov/nistpubs/SpecialPublications/NIST.SP.800-207.pdf (Year: 2020).*

* cited by examiner

*Primary Examiner* — Alexander Lagor
*Assistant Examiner* — Lydia L Noel (57) ABSTRACT

A method of testing a communication system implementing a zero trust architecture. The method comprises sending a request by a test equipment platform to access a microsegment to a policy enforcement point (PEP); sending an authorization request by the PEP to a policy decision point (PDP); authorizing access of the test equipment platform to the microsegment by the PDP; sending authorization of access of the test equipment platform to the microsegment by the PDP to the PEP; establishing a secure tunnel by the PEP between the test equipment platform and the microsegment; sending a command to provide test data by the test equipment platform via the secure tunnel to a probe in the microsegment; analyzing the test data by the test equipment platform; and producing a test result by the test equipment platform based on analyzing the test data.

20 Claims, 5 Drawing Sheets

TESTING NETWORK COMMUNICATION WITHIN A ZERO TRUST SECURITY MODEL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Until recently enterprise networks have often based their cybersecurity on a perimeter defense security strategy. According to this strategy, communications from outside the enterprise network are deemed untrusted and are scrutinized by a firewall device that blocks communications that it deems to be security threats and allows other communication that it deems secure. Communications inside the enterprise network are deemed inherently secure and, to a certain extent, communication among computers inside the enterprise network domain—inside the firewall—have been allowed to communicate "in the clear." The abstraction of a perimeter around the enterprise network, however, is being obsoleted by evolving computing and communication paradigms. Today, many enterprises relay upon computing platforms located not inside the enterprise but rather located in a third-party cloud computing environment. Additionally, rather than accessing the enterprise network from within a physical perimeter (e.g., on premise employees and desktop computers or laptop computers connected to a physical network inside the walls of buildings owned or leased by enterprises). In this context, the abstraction of a defensive perimeter is severely strained.

Recently a new enterprise network security strategy called a zero trust network environment has come to the fore. In a zero trust network architecture, the enterprise network domain is partitioned into a plurality of microsegments. Computers or execution platforms within a microsegment are allowed to communicate with each other "in the clear" (e.g., these intra-microsegment communications are deemed trusted and communicate without encrypting their messages) but communications between microsegments are deemed untrusted and may be required to be conducted via secure tunnels that rely upon encrypted communications between endpoints to secure the communication. It is expected that the zero trust network paradigm will be deployed widely. For example, United States presidential executive order 14028 dated May 12, 2021, and titled "Improving the Nation's Cybersecurity," orders in Section 3(b) (ii) that the head of each federal agency shall develop a plan to implement Zero trust Architecture.

SUMMARY

In an embodiment, a method of testing a communication system implementing a zero trust architecture is disclosed. The method comprises sending a first request by a test equipment platform to access a first microsegment to a first policy enforcement point (PEP); sending a first authorization request by the first PEP to a policy decision point (PDP); in response to the first authorization request, requesting attributes associated with the test equipment platform by the PDP; and, based on attributes associated with the test equipment platform received by the PDP, authorizing a first access level of the test equipment platform to the first microsegment by the PDP. The method further comprises sending authorization of the first access level of the test equipment platform to the first microsegment by the PDP to the first PEP; and, in response to the authorization of the first access level of the test equipment platform to the first microsegment, establishing a first secure tunnel by the first PEP between the test equipment platform and the first microsegment. The method further comprises sending a second request by a test equipment platform to access a second microsegment to a second PEP; sending a second authorization request by the second PEP to the PDP; based on attributes associated with the test equipment platform received by the PDP, authorizing a second access level of the test equipment platform to the second microsegment by the PDP; sending authorization of the second access level of the test equipment platform to the second microsegment by the PDP to the second PEP; and, in response to the authorization of the second access level of the test equipment platform to the second microsegment, establishing a second secure tunnel by the second PEP between the test equipment platform and the second microsegment. The method further comprises sending a first command by the test equipment platform to perform a first testing activity via the first secure tunnel to a first probe located in the first microsegment; enforcing that the first command is consistent with the first access level by the first PEP; sending the first command by the first PEP to the first probe; sending a second command by the test platform to perform a second testing activity via the second secure tunnel to a second probe located in the second microsegment; enforcing that the second command is consistent with the second access level by the second PEP; and sending the second command by the second PEP to the second probe. The method further comprises sending first test data associated with the first testing activity by the first probe via the first secure tunnel to the test equipment platform; sending second test data associated with the second testing activity by the second probe via the second secure tunnel to the test equipment platform; analyzing the first test data and the second test data by the test equipment platform; and producing a test result by the test equipment platform based on the analyzing.

In another embodiment, a communication system implementing a zero trust architecture is disclosed. The system comprises a policy decision point (PDP); a plurality of microsegments of the communication system, each microsegment comprising at least one execution platform and at least one test probe, wherein the at least one test probe is authorized to conduct unencrypted communication with the at least one execution platform; a plurality of policy enforcement points (PEPs), each PEP associated with one of the plurality of microsegments, wherein each PEP is configured to enforce authorization determinations received from the PDP on communication entering and exiting its associated microsegment and to enforce that authorized communication entering and exiting its associated microsegment takes place via a secure tunnel; and a test equipment platform. The test equipment platform comprises a processor, a non-transitory memory, and a testing application stored in the non-transitory memory that, when executed by the processor, establishes a secure tunnel with one of the plurality of PEPs, communicates via the secure tunnel with the at least one test probe within the microsegment associated with the one PEP to obtain information about the execution platform in the microsegment, analyzes the information obtained about the execution, and produces a test result based on analyzing the information.

In yet another embodiment, a method of testing a communication system implementing a zero trust architecture is disclosed. The method comprises sending a first request by a test equipment platform to access a first microsegment to a first policy enforcement point (PEP); sending a first authorization request by the first PEP to a policy decision point (PDP); authorizing access of the test equipment platform to the first microsegment by the PDP; sending authorization of access of the test equipment platform to the first microsegment by the PDP to the first PEP; and, in response to the authorization of access of the test equipment platform to the first microsegment, establishing a first secure tunnel by the first PEP between the test equipment platform and the first microsegment. The method further comprises sending a command to provide test data by the test equipment platform via the first secure tunnel to a first probe in the first microsegment; receiving first test data by the test equipment platform via the first secure tunnel from the first probe; analyzing the first test data by the test equipment platform; and producing a first test result by the test equipment platform based on analyzing the first test data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A zero trust security model is becoming important. Communication between devices in different microsegments, systems, or micro-services of a zero trust network occurs over secure tunnels that are based on encrypted communications and that is mediated, in part, by policy enforcement points (PEPs). A problem develops, however, for test equipment in such a zero trust network. A typical troubleshooting tactic may be monitoring packets flowing between communication nodes by test equipment, whereby to validate proper implementation of protocols. But when the communication is encrypted, the test equipment cannot access the communication: the test equipment is on the outside of the secure tunnel. Sometimes troubleshooting may entail test equipment querying probes that are positioned strategically in the enterprise network to capture information, but probes suffer from the same problem of being on the outside of the secure tunnel. Thus, this is a technical problem rooted in the technology of the newly developed zero trust architecture. The disclosure and claims will use the umbrella term microsegment hereafter to refer to a microsegment, a system, or a micro-service that is linked by a PEP to the rest of the zero trust network.

The present disclosure teaches a particular technical solution to this technical problem. The system of the present disclosure places a probe in each of a plurality of microsegments of a zero trust enterprise network. As such, these probes will be able to access the communications entering and leaving its microsegment "in the clear"—unencrypted. The probes can collect the desired test information from the microsegments, connect via an independent secure tunnel to the test equipment, and provide the collected information to the test equipment over the secure tunnel. In an embodiment, the secure tunnel may be established in part by authorization rules and policies defined for the test equipment. In the past, there was a one-to-one relationship between the test equipment and the probe. As taught herein in the zero trust enterprise network, there will be a one-to-many relationship between the test equipment and the probes in each of a plurality of different microsegments of the zero trust enterprise network. In an embodiment, some microsegments in a zero trust enterprise network may not be provided with probes, for example when the microsegment is deemed ultra-sensitive and requires ultra-rigorous cyber security.

The inter-microsegment communication in the zero trust enterprise network may be mediated by one or more PEP that enforces authorization of communication requests and secure tunnel formation determined by a policy decision point (PDP). Said in other words, the PDP makes authorization decisions, and the PEPs enforce those authorization decisions. The present disclosure teaches using this authorization infrastructure to deliver a fine-grained access policy that can be tailored specifically for test equipment that is configured into the PDP and enforced by the PEP. For example, access of test equipment can be discriminated based on identity and role of a craftsperson and based on microsegment. For example, a first level of access may restrict the test equipment to requesting and receiving collected data from a probe in a first microsegment. A second level of access may allow the test equipment to send test communication traffic to a probe in a second microsegment and command the probe to inject the test communication traffic into the microsegment. For example, the system disclosed herein may be used to grant selective access to an engineer (e.g., via the test equipment) who is authorized to access test probes for lab and engineering microsegments but restrict the same engineer from accessing production microsegments. For example, the system disclosed herein supports logging access by a craftsperson during a security audit or attack forensics process. For example, the system disclosed herein supports access control based on functional role or area, for example an engineer who deals with messaging systems would not have access to a microsegment associated with a location service platform; and an engineer who deals the location service platform would not have access to a microsegment associated with messaging systems. Such fine-grained test equipment access control is not current in the "test equipment inside the enterprise network perimeter" paradigm: test equipment in the traditional perimeter-based security model may have had unrestricted access to everything within the enterprise network.

Figure 1:
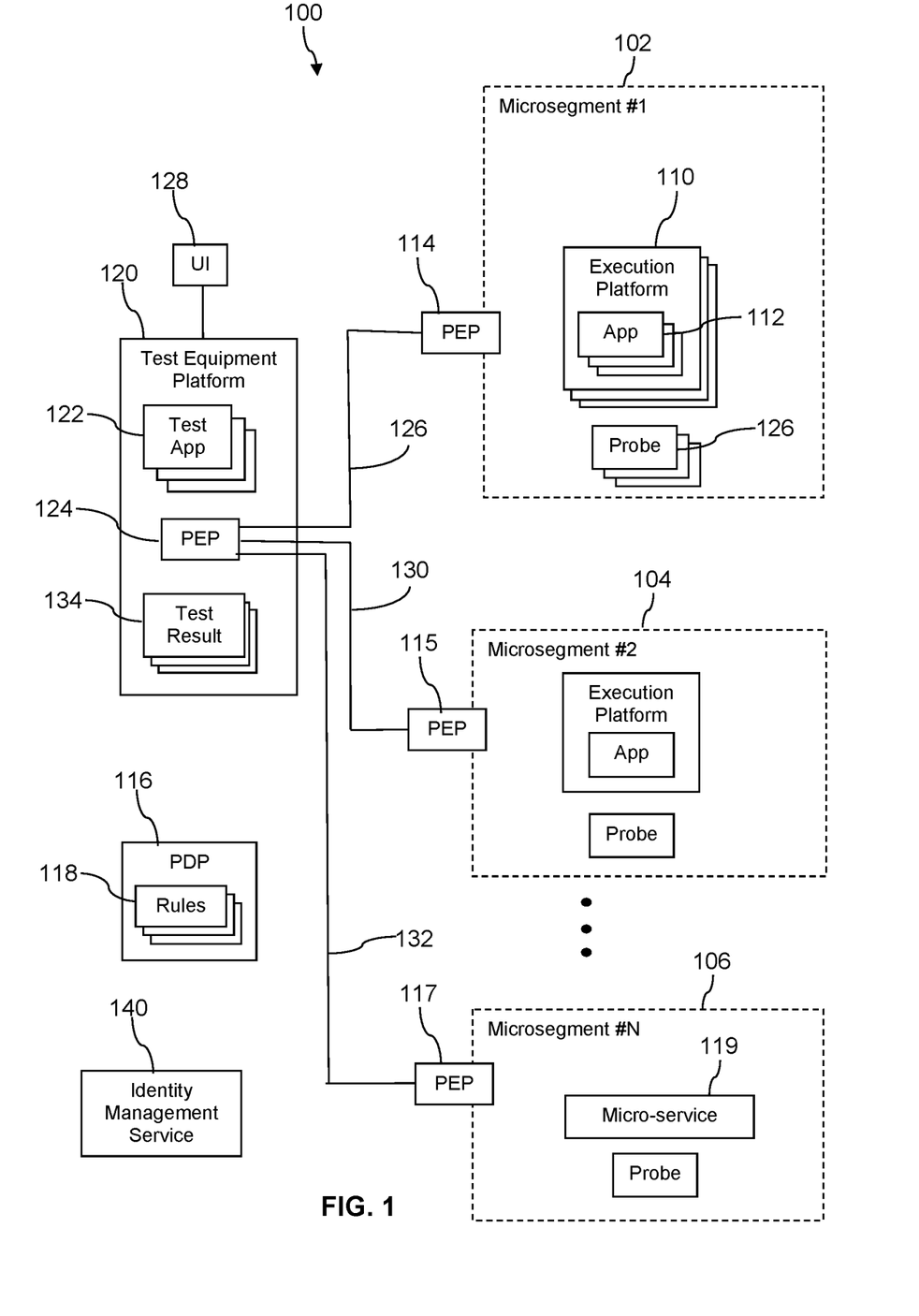
FIG. 1 is a block diagram of a zero trust communication system according to an embodiment of the disclosure.

Turning now to FIG. 1, a communication system 100 is described. The communication system 100 may be, for example, an enterprise network. The communication system 100 may be a communication network of a government agency or government department. In an embodiment, the system 100 comprises a plurality of microsegments or microdomains, for example a first microsegment 102, a second microsegment 104, and a third microsegment 106. It will be appreciated that the system 100 may comprise two microsegments, four microsegments, five microsegments, twenty-five microsegments, fifty microsegments, or any number of microsegments. In an embodiment, the system 100 implements a zero trust communication network architecture.

The microsegments 102, 104, 106 each comprise one or more execution platforms 110 executing one or more applications 112. In an embodiment, as illustrated, the first microsegment 102 comprises a plurality of execution platforms, the second microsegment 104 comprises a single execution platform, and the third microsegment 106 comprises a micro-service 119. It is understood that the micro-service 119 is a software application or bundle that executes on one or more computer systems. Communication access to the microsegments 102, 104, 106 is mediated by PEPs. Communication access to the first microsegment 102 is mediated by a first PEP 114; communication access to the second microsegment 104 is mediated by a second PEP 115; and communication access to the third microsegment 106 is mediated by a third PEP 117. In an embodiment, at least some of the microsegments 102, 104, 106 comprise one or more probes 126. An execution platform 110 may be implemented as one or more computers and may comprise a computer system. Computer systems are described further hereinafter with reference to FIG. 3. In an embodiment, the PEP 114 is an application that executes on a computer system in the microsegment 102, 104, 106.

The applications 112 may comprise an enterprise application or a plurality of different execution instances of the same enterprise application. The applications 112 may comprise a plurality of different enterprise applications. The applications 112 may comprise some other sort of application executing on the execution platform 110. The applications 112 may comprise a human resources management application, a financial accounting application, an on-line retail electronic commerce web site application, an inventory management application, a database management system (DBMS) application, or other applications. In an embodiment, the applications 112 may comprise telecommunication network function applications such as a user plane function (UPF) application, an authentication server function (AUSF) application, an access and mobility management function (AMF) application, a session management function (SMF) application, a network exposure function (NEF) application, a network repository function (NRF) application, a policy control function (PCF) application, a unified data management (UDM) application, a network slice selection function (NSSF) application, a network interworking function (NIF) application, and other 5G communication network functions.

As indicated further above, the term 'microsegment' is intended as a general term to refer to a microsegment, a system, or a microservice that has communication connectivity mediated by the same PEP. For example, the first microsegment 102 may comprise a plurality of execution platforms 110 or systems; the second microsegment 104 may have only a single execution platform or system; the third microsegment 106 may have only a single microservice. Communication access to the first microsegment 102 is mediated by the first PEP 114; communication access to the second microsegment 104 is mediated by the second PEP 115; and communication access to the third microsegment 106 is mediated by the third PEP 117.

The system 100 comprises a policy decision point (PDP) 116 from which the PEPs 114, 115, 117 in each of the microsegments 102, 104, 106 request authorization decisions. In an embodiment, the PDP 116 is an application that executes on a computer system within the communication system 100. The PDP 116 may be configured with rules and criteria for authorizing secure tunnels and inter-microsegment communications. The rules and criteria can define fine-grained authorized access controls that the PDP 116 can apply in granting, restricting, or denying access to microsegments 102, 104, 106, as described further hereinafter.

The system 100 further comprises a test equipment platform 120 that executes one or more test applications 122 and has a PEP 124. A user or craftsperson may use a user interface (UI) 128 provided by the test equipment platform 120 to provide credentials such as a user name and password to an identity management service 140 that authenticates the user and/or test equipment platform 120. The user, if authenticated, may launch one of the test applications 122, and the test application 122 may retrieve security credentials associated with the user from memory inside the test equipment platform 120. The test application 122 may use the user security credentials and test equipment platform security credentials to authenticate with the identity management service 140. The test equipment platform 120, for example the test application 122 and/or the PEP 124, may request a secure tunnel connection to one or more probes 126 from one or more PEPs 114, 115, 117. In turn, the PEPs 114, 115, 117 request a secure tunnel creation authorization decision from the PDP 116.

The PDP 116 may reach out to the identity management service 140 to learn if the user and/or test equipment platform 120 have been authenticated. If the identity management service 140 indicates the user and/or test equipment platform 120 are authenticated, the PDP 116 may authorize establishment of one or more concurrent secure tunnels between the PEP 124 in the test equipment platform and PEPs 114, 115, 117 associated to the microsegments 102, 104, 106. For example, the PEP 124 of the test equipment platform may establish a first secure tunnel 128 with the first PEP 114 associated to the first microsegment 102, establish a second secure tunnel 130 with the second PEP 115 associated to the second microsegment 104, and a secure tunnel 132 with the third PEP 117 associated to the third microsegment 106. The secure tunnels 128, 130, 132 may be established and used in accordance with an IPsec security protocol, a TLS security protocol, or another secure tunnel protocol.

The PDP 116 looks up access permissions and/or security rules that apply to the user or craftsperson and that apply to the test equipment platform 120. The access permissions can be conditioned on the role of the craftsperson, the test equipment platform 120, and on the microsegment 102, 104, 106 involved. Said in other words, the security policy defined for microsegments 102, 104, 106 can vary from microsegment to microsegment as well as from craftsperson role to craftsperson role. If the requested access is consistent with the access permissions the PDP 116 looks up, the PDP 116 authorizes the PEP 124 to establish the secure tunnel. The PEP 124 in the test equipment platform may likewise delegate authorization of the secure tunnel 128 to the PDP 116. While not illustrated in FIG. 1, it is understood that the microsegments 102, 104, 106 may communicate with each other via secure tunnels provided between microsegments 102, 104, 106 by the PEPs 114 of each of the microsegments 102, 104, 106.

When the secure tunnels 128, 130, 132 are established, communication between the test equipment platform 120 and microsegments 102, 104, 106 is conducted via encryption. More specifically, the communication between the PEP 124 in the test equipment platform 120 and the PEPs 114 in the microsegments 102, 104, 106 is encrypted. The PEP 124 in the test equipment platform 120 decrypts received messages and sends them in the clear to the test applications 122 and encrypts messages received from the test applications 122 before sending to the PEPs 114 in the microsegments 102, 104, 106. Likewise, the PEPs 114 decrypt received messages and send them in the clear to the applications 112 and/or to the probes 126 and encrypt messages received from the applications 112 and/or the probes 126 before sending to other PEPs 114 in other microsegments 102, 104, 106 and/or to the PEP 124 in the test equipment platform 120.

Once the secure tunnels 128, 130, 132 are established, the test application 122 can communicate with the probes 126 in a way which from their vantage point would appear to be "in the clear" communication (although the PEP 124 of the test equipment platform 120 and the PEPs 114 in the microsegments 102, 104, 106 are in fact encrypting and decrypting such communications transparently to the test applications 122 and the probes 126). The test application 122 may command the probes 126 to collect specific data about the execution of the applications 112 on the execution platform 110 and/or about communications of the applications 112 of the first microsegment 102 with applications in other microsegments 104, 106. In an embodiment, the probes 126 may be configured to collect data on execution of the applications 112 and/or the communications of the applications 112 on an on-going basis, and the test application 122 may periodically reach out to the probes 126 via the secure tunnels 128, 130, 132 to command the probes 126 to send this collected data to the test application 122. In an embodiment, the data may be referred to as test data. The data may be related to communication protocols such as HTTP, IP, TCP, and other protocols. For example, the data may comprise information about communication protocol compliance of the execution platform and/or communication protocol compliance between different microsegments 102, 104, 106 or between different execution platforms 110 each located in different microsegments 102, 104, 106.

The test applications 122 may analyze data received from the probes 126 via the secure tunnels 128, 130, 132 to evaluate test cases and to produce test results 134. The test results 134 may be presented via the UI 128 to the logged in user or craftsperson. Alternatively, the test applications 122 may send the test results 134 via an email or via a notification to responsible persons.

The PEPs 114 and the PEP 124 in the test equipment 120 may repeat the secure tunnel authorization process described above periodically or on the event of authorization triggers based on policy rules 118 in the PDP 116. For example, the secure tunnel authorization process may be repeated every 5 minutes, every 10 minutes, every 15 minutes, every 30 minutes, every hour, or on some other periodic interval. For example, the secure tunnel authorization process may be repeated on the event of the test application 122 launching a different test case.

The probe 126, at the command of a test application 122, may monitor communications within its microsegment 102, 104, 106 in the clear and send one or more messages to the test application 122 about the monitored communication. In an embodiment, a single probe 126 may be present in a microsegment and perform all the testing requests sent to it by the test application 122. In another embodiment, a plurality of probes 126 may be present in a microsegment, and different ones of the plurality of probes 126 may perform different test-related functions. For example, a first probe 126 may monitor a first one of the applications 112, and a second probe 126 may monitor a second one of the applications 112. A third probe 126 may generate test traffic to send to the applications 112. A fourth probe 126 may monitor messages sent from the applications 112 to the PEP 114, and a fifth probe 126 may monitor messages sent from the PEP 114 to the applications 112. In an embodiment, the probe(s) 126 is an application that executes on a computer system in the microsegment 102, 104, 106. In an embodiment, the probe(s) 126 may be implemented as a sidecar within a stack of a container.

In an embodiment, the test equipment platform 120 may be used to run a sequence of test cases, for example to validate a microsegment 102, 104, 106 or an application 112 being deployed to a production environment. In an embodiment, the test equipment platform 120 may be used to perform troubleshooting on a previously deployed application 112, execution platform 110, or microsegment 102, 104, 106. In an embodiment, the UI 128 may allow a user or craftsperson to send a series of commands from the test application 122 to the probe 126 to complete reads and other commands identified by the user of craftsperson.

It is understood that the PDP 116 can enforce predefined access policies that provide fine grained access permissions to the test equipment platform 120 such that only sufficient access to complete a given troubleshooting activity is granted without granting excess access, for example following the security principle of least privilege. This fine-grained access control may be mediated by the identity of the user or craftsperson using the UI 128 or by a role assigned to the user or craftsperson. For example, craftsperson associated with a conventional software test or integration test effort may be restricted to a certain level of access while engineers tasked with maintaining the communication system 100 may be granted a higher level of access. The access can be restricted by kinds of commands that are allowed—such as read permission only; read and write permission; read, write, and delete permission. These permissions can be different for the same craftsperson or same role for different microsegments 102, 104, 106. In an embodiment, the PDP 116 can contain different rules or policies for different access permissions based on the specific device the craftsperson is logging in from, or said in other words based on where the craftsperson accesses the UI 128. If the craftsperson accesses the UI 128 from an enterprise controlled laptop or desktop computer on a LAN on the premise of the enterprise, for example, higher level access permission may be granted than if the craftsperson access the UI 128 from a tablet computer from his or her home or from his or her smart phone.

In an embodiment, the PDP 116 can enforce different access permissions of a craftsperson to different probes 126 inside the same microsegment 102, 104, 106. Said in other words, probes 126 may be implemented with different access capabilities, and access permissions or access levels can be enforced by restricting which probes 126 the test application 122 is authorized to communicate with. For example, a first probe 126 may only be capable of performing reads within the microdomain 102, 104, 106; a second probe 126 may be capable of performing reads and writes within the microdomain 102, 104, 106; a third probe 126 may be capable of performing reads, writes, and deletes within the microdomain 102, 104, 106.

Figure 2A:
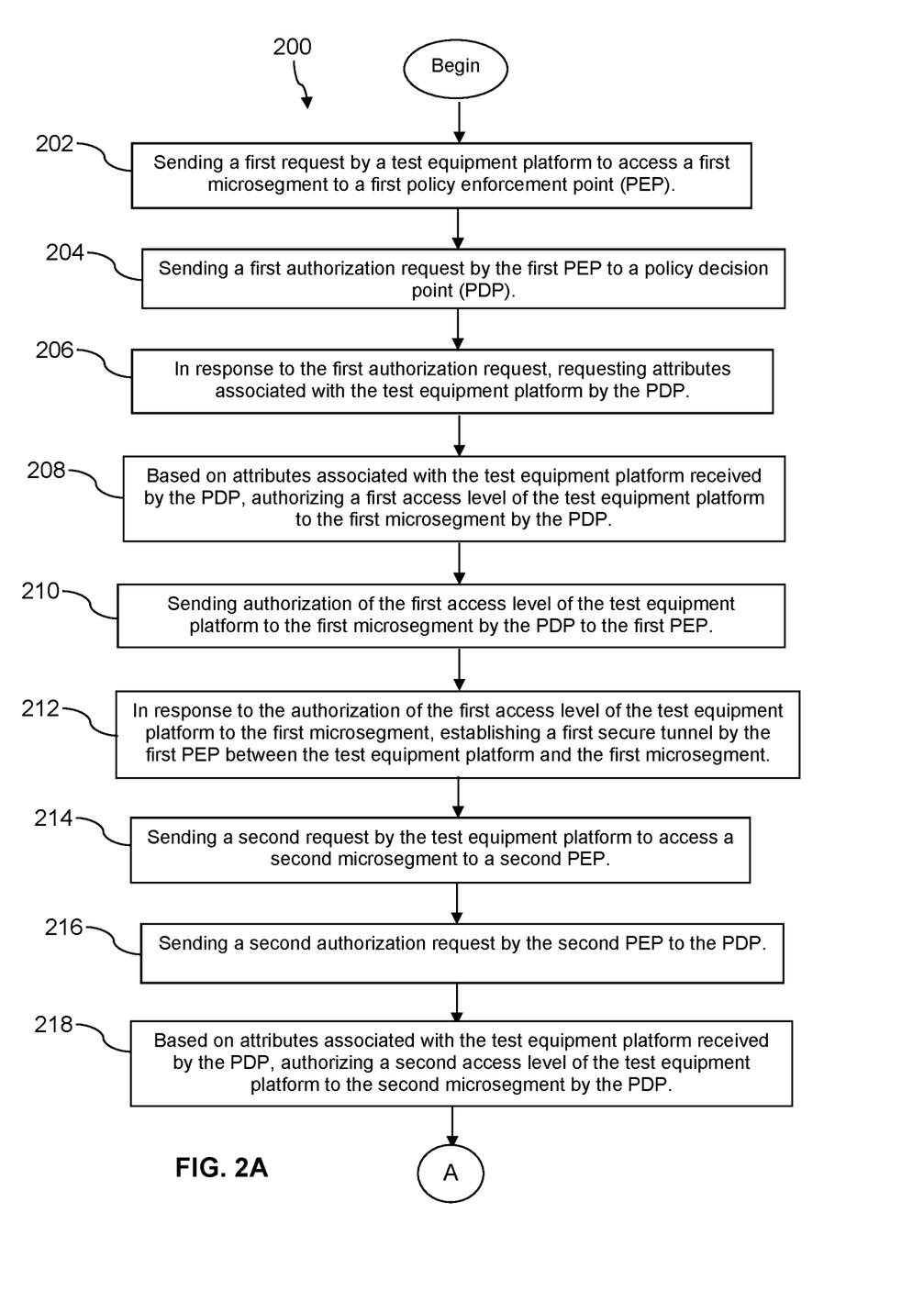
FIG. 2A, FIG. 2B, and FIG. 2C is a flow chart of a method according to an embodiment of the disclosure.
Figure 2B:
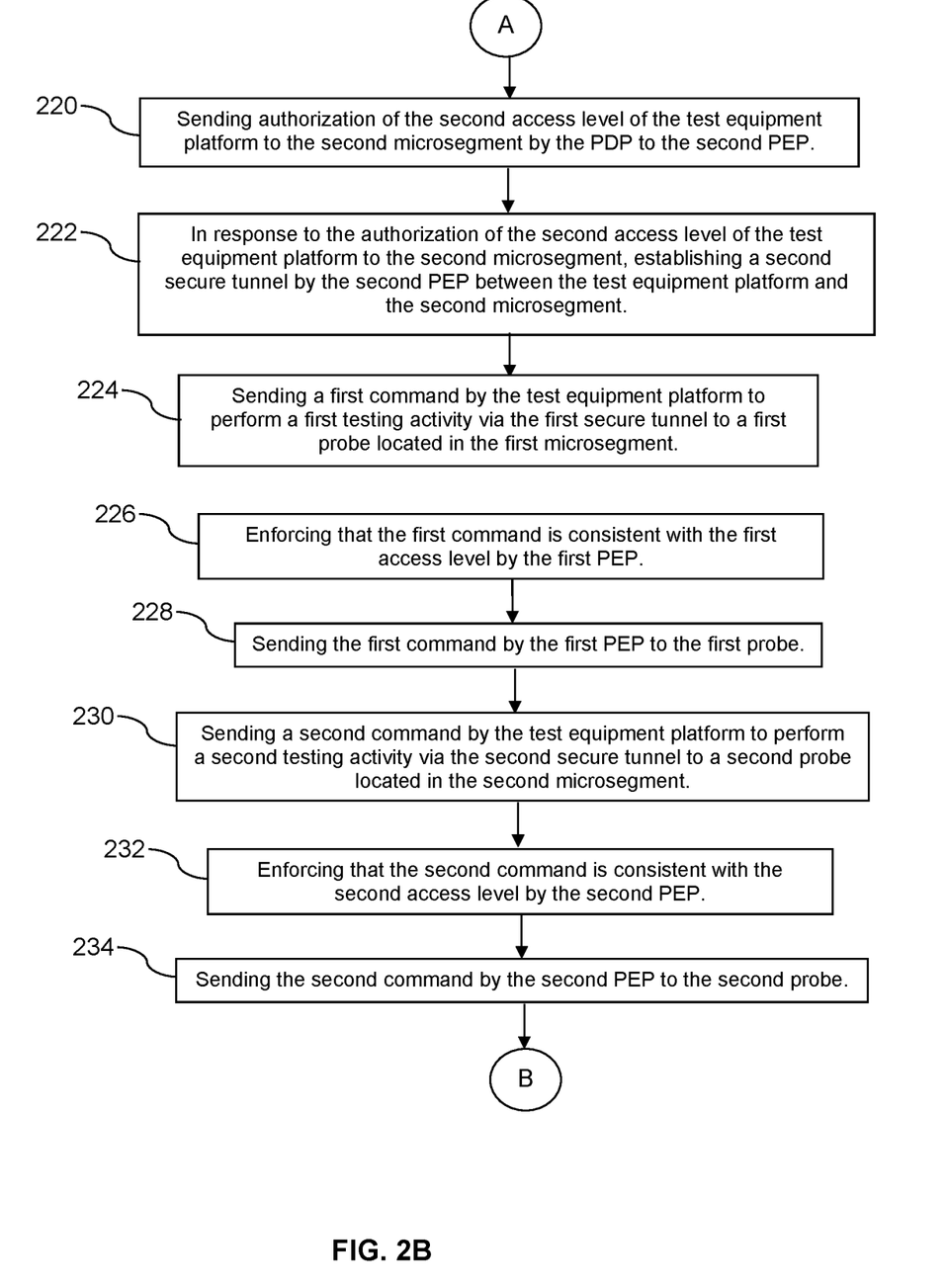
Figure 2C:
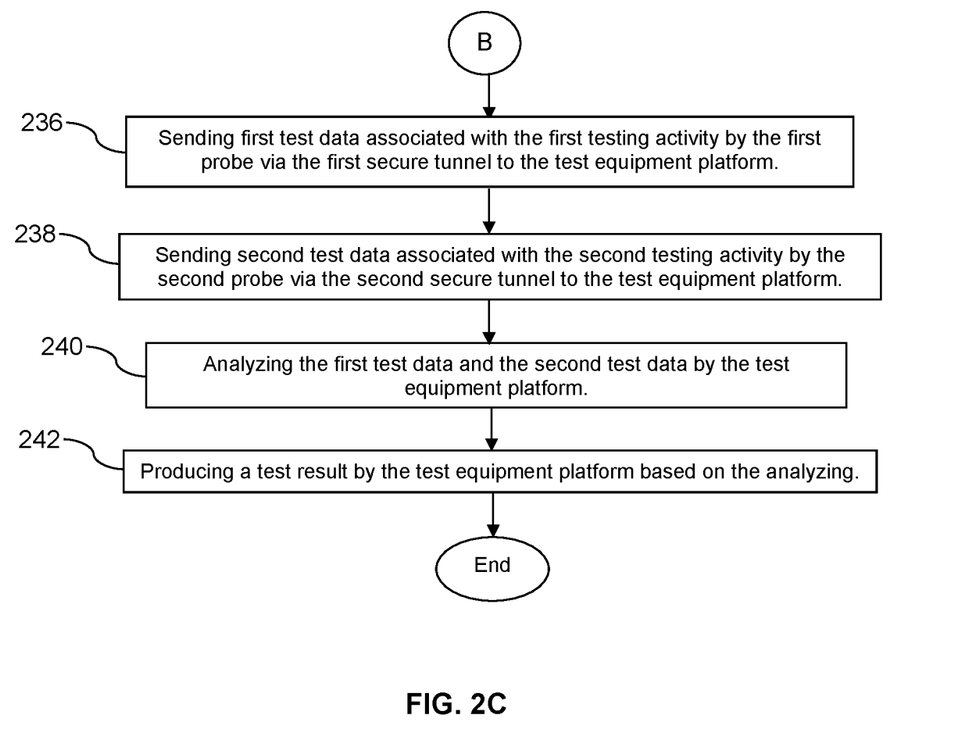

Turning now to FIG. 2A, FIG. 2B, and FIG. 2C, a method 200 is described. In an embodiment, the method 200 comprises a method of testing a communication system implementing a zero trust architecture. At block 202, the method 200 comprises sending a first request by a test equipment platform to access a first microsegment to a first policy enforcement point (PEP). At block 204, the method 200 comprises sending a first authorization request by the first PEP to a policy decision point (PDP).

At block 206, the method 200 comprises, in response to the first authorization request, requesting attributes associated with the test equipment platform by the PDP. For example, the PDP may request authentication of the test equipment platform and/or a user of the test equipment platform from an identity management service that is disposed outside of the zero trust architecture. The identity management service may perform an authentication process with the test equipment platform and/or a user. The authentication process completed by the identity management service may involve two factor authentication or other security challenges. The PDP may request other attributes from other services outside of the zero trust architecture. Other attributes may include a role of the user and/or of the test equipment platform such as administrator role, tester role, technician role, or other. Other attributes may include a software version number of the test equipment platform or an operating system identity and version number of the test equipment platform. At block 208, the method 200 comprises, based on attributes associated with the test equipment platform received by the PDP, authorizing a first access level of the test equipment platform to the first microsegment by the PDP. In an embodiment, the processing of block 208 may comprise executing an attribute-based access control rule set using the collected attributes as input to a rules engine within the PDP. The rules may be articulated in a plurality of logical statements. One rule, for example, may state if the user is an administrator AND if the entity (e.g., here the test equipment platform) is updated to version 3.7 AND if the entity is the test equipment platform AND if access is only requested to level 1 THEN allow this connection request. It is understood that other rules may be defined in other ways and with other conditions.

At block 210, the method 200 comprises sending authorization of the first access level of the test equipment platform to the first microsegment by the PDP to the first PEP. At block 212, the method 200 comprises, in response to the authorization of the first access level of the test equipment platform to the first microsegment, establishing a first secure tunnel by the first PEP between the test equipment platform and the first microsegment.

At block 214, the method 200 comprises sending a second request by the test equipment platform to access a second microsegment to a second PEP. At block 216, the method 200 comprises sending a second authorization request by the second PEP to the PDP.

At block 218, the method 200 comprises, based on attributes associated with the test equipment platform received by the PDP, authorizing a second access level of the test equipment platform to the second microsegment by the PDP. At block 220, the method 200 comprises sending authorization of the second access level of the test equipment platform to the second microsegment by the PDP to the second PEP.

At block 222, the method 200 comprises, in response to the authorization of the second access level of the test equipment platform to the second microsegment, establishing a second secure tunnel by the second PEP between the test equipment platform and the second microsegment. At block 224, the method 200 comprises sending a first command by the test equipment platform to perform a first testing activity via the first secure tunnel to a first probe located in the first microsegment.

At block 226, the method 200 comprises enforcing that the first command is consistent with the first access level by the first PEP.

At block 228, the method 200 comprises sending the first command by the first PEP to the first probe. At block 230, the method 200 comprises sending a second command by the test platform to perform a second testing activity via the second secure tunnel to a second probe located in the second microsegment. At block 232, the method 200 comprises enforcing that the second command is consistent with the second access level by the second PEP. At block 234, the method 200 comprises sending the second command by the second PEP to the second probe.

At block 236, the method 200 comprises sending first test data associated with the first testing activity by the first probe via the first secure tunnel to the test equipment platform. In an embodiment, the first access level provides read access which permits the first probe to read data in the first microsegment and the first test data comprises the data read by the first probe. At block 238, the method 200 comprises sending second test data associated with the second testing activity by the second probe via the second secure tunnel to the test equipment platform. In an embodiment, the second access level provides write access which permits the second probe to write data in the second microsegment and the second test data comprises responses of the second microsegment to the data written by the second probe. In an embodiment, the data written by the second probe to the second microsegment and the responses of the second microsegment to the data written by the second probe comprises information about communication protocols implemented by an application executing in the second microsegment. In an embodiment, the communication protocols comprise one of an HTTP protocol, an IP protocol, a TCP protocol, or a UDP protocol. In an embodiment, the application comprises a human resources management application, a financial accounting application, an on-line retail electronic commerce web site application, an inventory management application, or a database management system (DBMS) application. In an embodiment, the application executing in the second microsegment comprises a telecommunications network function. In an embodiment, the telecommunications network function comprises a user plane function (UPF) application, an authentication server function (AUSF) application, an access and mobility management function (AMF) application, a session management function (SMF) application, a network exposure function (NEF) application, a network repository function (NRF) application, a policy control function (PCF) application, a unified data management (UDM) application, a network slice selection function (NSSF) application, or a network interworking function (NIF) application.

At block 240, the method 200 comprises analyzing the first test data and the second test data by the test equipment platform. At block 242, the method 200 comprises producing a test result by the test equipment platform based on the analyzing. In an embodiment, the first test data may be analyzed in combination with the second test data by the test equipment platform to produce a test result.

In an embodiment, the method 200 further comprises logging communication of the first test equipment platform with the first probe via the first secure tunnel by the first PEP; and analyzing the logged communication to determine if there is malicious activity by the first test equipment platform. The analyzing may be performed by the first PEP or by another application executing on another computer system in the communication system (e.g., within the zero trust communication system).

Figure 3:
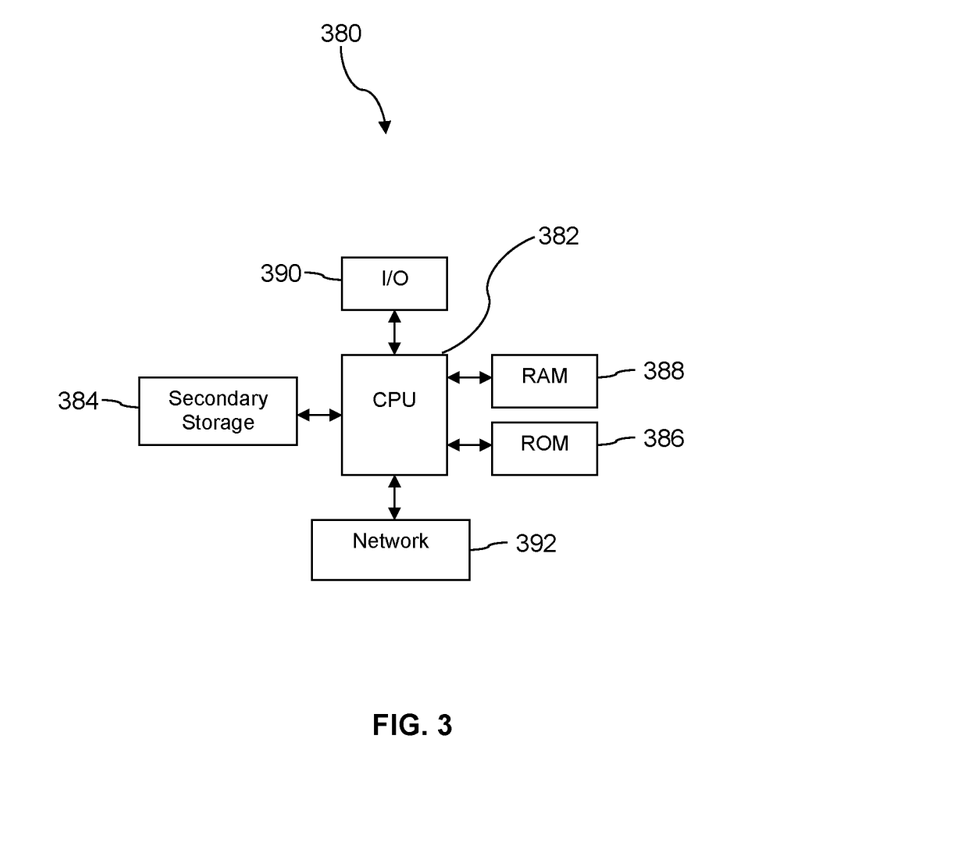
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of testing a communication system implementing a zero trust architecture, comprising:
sending a first request by a test equipment platform to access a first microsegment to a first policy enforcement point (PEP);
sending a first authorization request by the first PEP to a policy decision point (PDP);
in response to the first authorization request, requesting attributes associated with the test equipment platform by the PDP;
based on attributes associated with the test equipment platform received by the PDP and attributes of the first microsegment, authorizing a first access level of the test equipment platform to the first microsegment by the PDP;
sending authorization of the first access level of the test equipment platform to the first microsegment by the PDP to the first PEP;
in response to the authorization of the first access level of the test equipment platform to the first microsegment, establishing a first secure tunnel by the first PEP between the test equipment platform and the first microsegment;
sending a second request by the test equipment platform to access a second microsegment to a second PEP;
sending a second authorization request by the second PEP to the PDP;
based on attributes associated with the test equipment platform received by the PDP and attributes of the second microsegment, authorizing a second access level of the test equipment platform to the second microsegment by the PDP;
sending authorization of the second access level of the test equipment platform to the second microsegment by the PDP to the second PEP;
in response to the authorization of the second access level of the test equipment platform to the second microsegment, establishing a second secure tunnel by the second PEP between the test equipment platform and the second microsegment;
sending a first command by the test equipment platform to perform a first testing activity via the first secure tunnel to a first probe located in the first microsegment;
responsive to the first command being authorized according to the first access level, sending the first command by the first PEP to the first probe;
sending a second command by the test platform to perform a second testing activity via the second secure tunnel to a second probe located in the second microsegment;
responsive to the second command being authorized according to the second access level, sending the second command by the second PEP to the second probe;
sending first test data associated with the first testing activity by the first probe via the first secure tunnel to the test equipment platform;
sending second test data associated with the second testing activity by the second probe via the second secure tunnel to the test equipment platform;
analyzing the first test data and the second test data by the test equipment platform; and
producing a test result by the test equipment platform based on the analyzing.

2. The method of claim 1, wherein the first access level provides read access which permits the first probe to read data in the first microsegment and the first test data comprises the data read by the first probe.

3. The method of claim 1, wherein the second access level provides write access which permits the second probe to write data in the second microsegment and the second test data comprises responses of the second microsegment to the data written by the second probe.

4. The method of claim 3, wherein the data written by the second probe to the second microsegment and the responses of the second microsegment to the data written by the second probe comprises information about communication protocols implemented by an application executing in the second microsegment.

5. The method of claim 4, wherein the communication protocols comprise one of an HTTP protocol, an IP protocol, a TCP protocol, or a UDP protocol.

6. The method of claim 4, wherein the application executing in the second microsegment comprises a telecommunications network function.

7. The method of claim 6, wherein the telecommunications network function comprises a user plane function (UPF) application, an authentication server function (AUSF) application, an access and mobility management function (AMF) application, a session management function (SMF) application, a network exposure function (NEF) application, a network repository function (NRF) application, a policy control function (PCF) application, a unified data management (UDM) application, a network slice selection function (NSSF) application, or a network interworking function (NIF) application.

8. The method of claim 4, wherein the application comprises a human resources management application, a financial accounting application, an on-line retail electronic commerce web site application, an inventory management application, or a database management system (DBMS) application.

9. A communication system implementing a zero trust architecture, comprising:
a policy decision point (PDP);
a plurality of microsegments of the communication system, each microsegment comprising at least one execution platform and at least one test probe, wherein the at least one test probe is authorized to conduct unencrypted communication with the at least one execution platform;
a plurality of policy enforcement points (PEPs), each PEP associated with one of the plurality of microsegments, wherein each PEP is configured to enforce authorization determinations received from the PDP on communication entering and exiting its associated microsegment and to enforce that authorized communication entering and exiting its associated microsegment takes place via a secure tunnel;
a test equipment platform comprising:
a processor,
a non-transitory memory, and
a testing application stored in the non-transitory memory that, when executed by the processor, establishes a secure tunnel with one of the plurality of PEPs, communicates via the secure tunnel with the at least one test probe within the microsegment associated with the one PEP to obtain information about the execution platform in the microsegment, analyzes the information obtained about the execution, and produces a test result based on analyzing the information, wherein responsive to a command being authorized according to an authorization determination received from the PDP, the PEP is configured to send the command to the at least one test probe.

10. The communication system of claim 9, wherein the PDP obtains attributes associated with the test equipment platform from elements of the communication system outside of the zero trust architecture and makes authorization determinations for access by the test equipment platform to microsegments based at least in part on comparing the attributes associated with the test equipment platform to microsegment access rules.

11. The communication system of claim 10, wherein the PDP is an application that executes on a computer system.

12. The communication system of claim 9, wherein the PEP associated with each of the plurality of microsegments is an application that executes on a computer system in the microsegment.

13. The communication system of claim 9, wherein the information obtained by the testing application comprises information about communication protocol compliance of the execution platform.

14. The communication system of claim 9, wherein the testing application communicates with the at least one test probe within the one of the plurality of microsegments by commanding the test probe to send communication traffic to the execution platform in the microsegment.

15. A method of testing a communication system implementing a zero trust architecture, comprising:
   sending a first request by a test equipment platform to access a first microsegment to a first policy enforcement point (PEP);
   sending a first authorization request by the first PEP to a policy decision point (PDP);
   authorizing access of the test equipment platform to the first microsegment by the PDP;
   responsive to a command of the first request being authorized based on attributes of the first microsegment and the test equipment platform, sending authorization of access of the test equipment platform to the first microsegment by the PDP to the first PEP;
   in response to the authorization of access of the test equipment platform to the first microsegment, establishing a first secure tunnel by the first PEP between the test equipment platform and the first microsegment;
   sending the command by the test equipment platform via the first secure tunnel to a first probe in the first microsegment, the command to provide test data;
   receiving first test data by the test equipment platform via the first secure tunnel from the first probe;
   analyzing the first test data by the test equipment platform; and
   producing a first test result by the test equipment platform based on analyzing the first test data.

16. The method of claim 15, wherein the command to provide test data commands the first probe to send messages to an application executing on an execution platform in the first microsegment to test compliance of the application executing on the execution platform with a communication protocol.

17. The method of claim 15, further comprising:
   logging communication of the first test equipment platform with the first probe via the first secure tunnel by the first PEP; and
   analyzing the logged communication to determine if there is malicious activity by the first test equipment platform.

18. The method of claim 15, further comprising:
   sending a second request by the test equipment platform to access a second microsegment to a second PEP;
   in response to receiving an authorization of access of the test equipment platform to the second microsegment, establishing a second secure tunnel by the second PEP between the test equipment platform and the second microsegment;
   sending a command to provide test data by the test equipment platform via the second secure tunnel to a second probe in the second microsegment;
   receiving second test data by the test equipment platform via the second secure tunnel from the second probe;
   analyzing the second test data by the test equipment platform; and
   producing a second test result by the test equipment platform based on analyzing the second test data.

19. The method of claim 15, further comprising:
   sending a second request by the test equipment platform to access a second microsegment to a second PEP;
   in response to receiving an authorization of access of the test equipment platform to the second microsegment, establishing a second secure tunnel by the second PEP between the test equipment platform and the second microsegment;
   sending a command to provide test data by the test equipment platform via the second secure tunnel to a second probe in the second microsegment;
   receiving second test data by the test equipment platform via the second secure tunnel from the second probe;
   analyzing the first test data in combination with the second test data by the test equipment platform; and
   producing a second test result by the test equipment platform based on analyzing the first test data in combination with the second test data.

20. The method of claim 19, wherein the second test result supports troubleshooting between different microsegments.

* * * * *